US011486786B2

(12) United States Patent
Childers et al.

(10) Patent No.: US 11,486,786 B2
(45) Date of Patent: Nov. 1, 2022

(54) TORQUE TESTING AND CALIBRATION SYSTEM

(71) Applicants: Gary Childers, Lewisburg, OH (US); Scott L. Childers, Oxford, GA (US)

(72) Inventors: Gary Childers, Lewisburg, OH (US); Scott L. Childers, Oxford, GA (US)

(*) Notice: Subject to any disclaimer, the term of this patent is extended or adjusted under 35 U.S.C. 154(b) by 505 days.

(21) Appl. No.: 16/695,803

(22) Filed: Nov. 26, 2019

(65) Prior Publication Data
US 2020/0166426 A1 May 28, 2020

Related U.S. Application Data (60) Provisional application No. 62/771,391, filed on Nov. 26, 2018.

(51) Int. Cl.
*G01L 25/00* (2006.01)
*B25B 23/14* (2006.01)
*G01L 3/20* (2006.01)
*B25B 17/02* (2006.01)

(52) U.S. Cl.
CPC ........ *G01L 25/003* (2013.01); *B25B 23/1405* (2013.01); *G01L 3/20* (2013.01); *B25B 17/02* (2013.01)

(58) Field of Classification Search
CPC ... B25B 17/02; B25B 23/1405; G01L 25/003; G01L 3/20
See application file for complete search history.

(56) References Cited

U.S. PATENT DOCUMENTS

| | | |
|---|---|---|
| 4,171,647 A | 10/1979 | Herrgen |
| 4,583,411 A | 4/1986 | Hales |
| 4,976,133 A | 12/1990 | Pohl |
| 5,181,425 A | 1/1993 | Livingston |
| 6,718,831 B2 | 4/2004 | Chiapuzzi et al. |
| 7,222,544 B1 | 5/2007 | Jenkins |
| 7,594,446 B2 | 9/2009 | Schwafertz |
| 7,832,285 B2 | 11/2010 | Hsieh |
| 7,885,780 B2 | 2/2011 | Lucke |
| 8,117,887 B2 | 2/2012 | Schwafertz et al. |
| 8,650,928 B2 | 2/2014 | Herbold |
| 8,713,986 B2 | 5/2014 | Hsieh |

(Continued)

FOREIGN PATENT DOCUMENTS

WO 2016103150 A1 6/2016

*Primary Examiner* — Jamel E Williams
(74) *Attorney, Agent, or Firm* — Dinsmore & Shohl LLP (57) ABSTRACT

Methods and associated system for calibrating a torque device are provided. The method includes (I) providing a master torque tool having an accepted calibration, (II) attaching the torque device to be calibrated to an input shaft of a testing and calibration system, (III) energizing the torque device to a free spin under a no load and zero torque condition, (IV) performing a run down test by activating a torque engagement mechanism to transferred torque from the torque device to the master torque tool, (V) measuring a torque value from the master torque tool, the torque device, and the rotary inline torque transducer to generate a data set, (IX) repeating steps (IV) to generate a plurality of data sets and (V), and (VI) generating new calibration factors for input into a programmable control system of the torque device based on the plurality of data sets with a software package.

20 Claims, 4 Drawing Sheets

(56) References Cited

U.S. PATENT DOCUMENTS

| | | |
|---|---|---|
| 8,833,134 B2 | 9/2014 | Gray et al. |
| 8,984,928 B2 | 3/2015 | Sumimoto et al. |
| 9,242,356 B2 | 1/2016 | King et al. |
| 9,410,863 B2 | 8/2016 | Nichols |
| 9,533,414 B2 | 1/2017 | Kosaka et al. |
| 2003/0056605 A1 | 3/2003 | Chiapuzzi et al. |
| 2009/0222222 A1 | 9/2009 | Lucke |
| 2009/0265135 A1 | 10/2009 | Hetzel |
| 2010/0270721 A1 | 10/2010 | Liu |
| 2014/0345357 A1 | 11/2014 | Gray et al. |
| 2015/0369686 A1 | 12/2015 | Lawson |
| 2016/0061702 A1 | 3/2016 | Yang |
| 2016/0123832 A1 | 5/2016 | Wu |
| 2018/0045595 A1* | 2/2018 | Kleza .................... F04D 29/042 |
| 2019/0094096 A1* | 3/2019 | Ganguin ............... G01L 25/003 |

* cited by examiner

TORQUE TESTING AND CALIBRATION SYSTEM

CROSS-REFERENCE TO RELATED APPLICATIONS

This application claims the benefit of U.S. Provisional Application Ser. No. 62/771,391, filed Nov. 26, 2018.

TECHNICAL FIELD

The present disclosure relates to methods and associated apparatuses for calibration of torque generating tools.

BACKGROUND

In industrial and manufacturing facilities worldwide electric, pneumatic, and manual tools are used to secure fasteners. In many applications specific parameters regarding the torque and angle of rotation of the fasteners are monitored for quality assurance purposes. However, usage of the tools used to apply torque to the fasteners during assembly operations results in the tools wearing and their factory calibrations no longer being accurate. This may result in an operator believing a fastener is secured in accordance with the proscribed parameters when in reality securement is outside the allowable range. As such, the tools used to apply torque to the fasteners during assembly operations must be calibrated and certified as accurate on a periodic basis.

Current methods of calibrating torque drivers rely on mashing a spring or stack of belleville washers to act as a simulated joint being secured. However, such process requires unwinding the washer stack after each testing iteration which requires time and does not provide a repeatable torque joint. For example, a controller has the ability to shut off when a target torque value is reached, but the shut off may vary greatly for the same joint with each test run. It will further be appreciated that the current methods also require manual recordation of torque measurements during calibration procedures which must then be manually input into a computer medium for calculation of updated calibration factors and/or production of a calibration certification. Such manual process is both time consuming and prone to input errors and does not accurately replicate the characteristics of an actual joint.

SUMMARY

As such, there is a need for improved methods and systems for calibrating and testing torque devices. The present embodiments address these needs by providing methods and systems which institute a master torque tool with an accepted calibration and a torque engagement mechanism which controllably engages a connection to transfer torque between the master torque tool and a torque device to be calibrated. The present embodiments also implement a software package to communicate with controllers of the torque device to be calibrated to automatically collect torque and angular measurements during the calibration process to generate updated calibration factors and print a calibration certification.

Embodiments of the present disclosure relate to methods of calibrating a torque device. The method includes (I) providing a master torque tool, the master torque tool having an accepted calibration and (II) attaching the torque device to be calibrated to an input shaft of a testing and calibration system. The testing and calibration system includes the master torque tool, a rotary inline torque transducer engaged with a square drive of the master torque tool, the input shaft where the input shaft is configured to engage with a square drive of the torque device, a torque engagement mechanism operable to transfer rotational torque from the input shaft to the rotary inline torque transducer via an output shaft upon reversible activation of the torque engagement mechanism, and a test activator configured to allow an operator of the system to initiate a single rundown test of the torque device. The method further includes (III) energizing the torque device to a free spin under a no load and zero torque condition such that the input shaft rotates and (IV) initiating a single run down test by actuating the test activator, wherein actuating the test activator causes the torque engagement mechanism to activate such that rotational torque from the input shaft is transferred to the rotary inline torque transducer via the output shaft and from the rotary inline torque transducer to the master torque tool. Further, the method includes (V) measuring a first parameter representative of a torque value from the master torque tool, (VI) measuring a second parameter representative of a torque value from the torque device, (VII) measuring a third parameter representative of a torque value from the rotary inline torque transducer, and (VIII) transferring the first parameter, the second parameter, and the third parameter to a software package. Additionally, step (IX) includes repeating steps (IV) through (VIII) to generate a plurality of data sets, each data set comprising the first parameter, the second parameter, and the third parameter from a single iteration of steps (IV) through (VIII) and (X) generating new calibration factors for input into a programmable control system of the torque device based on the plurality of data sets.

Further embodiments of the present disclosure relate to a system for testing and calibration of a torque device. The system includes a master torque tool having an accepted calibration, a rotary inline torque transducer engaged with a square drive of the master torque tool, an input shaft configured to engage with a square drive of the torque device, a torque engagement mechanism operable to transfer rotational torque from the input shaft to the rotary inline torque transducer via an output shaft upon reversible activation of the torque engagement mechanism, a front support stanchion configured to engage and support the input shaft, a rear support stanchion configured to engage and support the output shaft, and a test activator configured to allow an operator of the system to initiate a single rundown test of the torque device.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Methods and fixtures for testing and calibrating torque tools are provided.

The methods of the present disclosure generally include calibration of a first torque tool using a series of gold standard dead weight calibrations and instruments. The first torque tool is thereafter labeled as the master torque tool and subsequently provided torque tools may be calibrated to match the master torque tool. Specifically, a fixture in accordance with the present disclosure allows the master torque tool and the torque tool to be tested and/or calibrated to be reversibly engaged with the other to allow simultaneous torque measurements to be generated. This operation allows for accurate calibration of the master torque tool using an accepted gold standard calibration technique and then matching the calibration of further torque tools based on the known accurate master torque tool.

Generally and with reference to FIGS. 1-4, a method of calibrating a torque device 5 in accordance with the present disclosure comprises providing a master torque tool 10, the master torque tool 10 having an accepted calibration and then calibrating the torque device 5 utilizing the known calibration of the master torque tool 10. The torque device 5 to be calibrated is attached to an input shaft 30 of a testing and calibration system which transfers and measures torque between the master torque tool 10 and the torque device 5 to be calibrated. Specifically, the testing and calibration system includes, the master torque tool 10, a rotary inline torque transducer 20 engaged with a square drive 12 of the master torque tool 10, the input shaft 30, a torque engagement mechanism 40 operable to transfer rotational torque from the input shaft 30 to the rotary inline torque transducer 20 via an output shaft 42 upon reversible activation of the torque engagement mechanism 40, and a test activator 50 configured to allow an operator of the system to initiate a single rundown test of the torque device 5. The torque device 5 is then energized to a free spin under a no load and zero torque condition such that the input shaft 30 rotates. A single run down test is then initiated by actuating the test activator 50. Actuating the test activator 50 causes the torque engagement mechanism 40 to activate such that rotational torque from the input shaft 30 is transferred to the rotary inline torque transducer 20 via the output shaft 42 and from the rotary inline torque transducer 20 to the master torque tool 10. A series of at least three parameters are measured and recorded during the run down test. The parameters include a first parameter representative of a torque value from the master torque tool 10, a second parameter representative of a torque value from the torque device 5, and a third parameter representative of a torque value from the rotary inline torque transducer 20. The first parameter, the second parameter, and the third parameter are then transferred to a software package. The run down test is repeated to generate a plurality of data sets, each data set comprising the first parameter, the second parameter, and the third parameter from a single run down test. Finally, new calibration factors for input into a programmable control system 16 of the torque device 5 based on the plurality of data sets are generated based on the plurality of data sets.

Having generally described a method of calibrating a torque device 5 in accordance with the present disclosure, embodiments of each step of the method will now be discussed in further detail.

Figure 1:
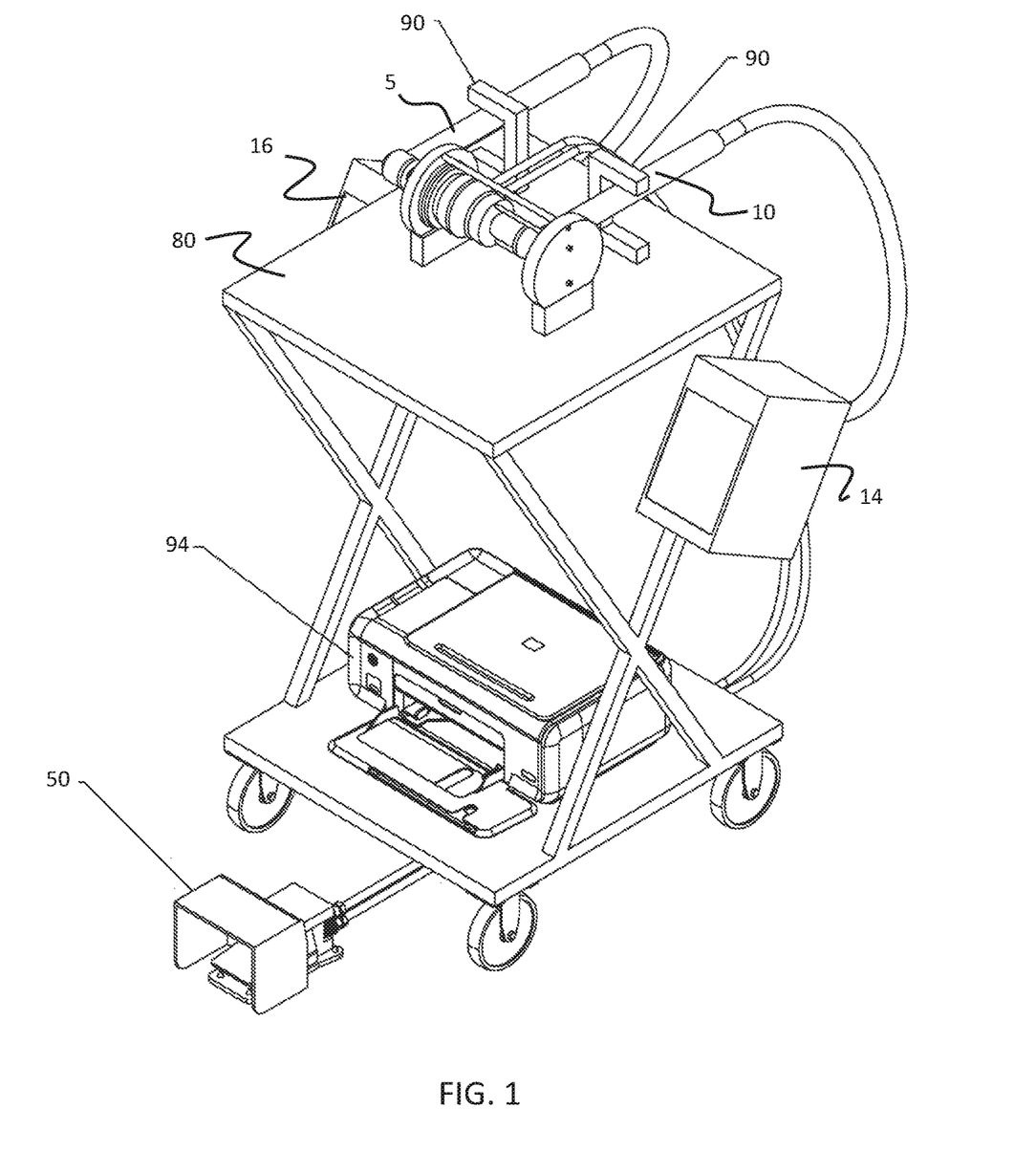
FIG. 1 schematically depicts a system for testing and calibration of a torque device according to one or more embodiments shown or described herein.

In one or more embodiments, the master torque tool 10 is a direct current (DC) torque tool. It will be appreciated by one skilled in the art that a DC torque tool may include a DC right-angle torque tool or an DC inline torque tool, for example, as commonly implemented in industrial assembly applications. However, for conciseness, reference is made to a DC right-angle torque tool throughout the present disclosure and it will be appreciated that other torque tools known to those skilled in the art maybe substituted. An example of the testing and calibration system with a DC right-angle torque tool serving as the master torque tool 10 is illustrated in FIG. 1. The DC right-angle torque tool may be calibrated using conventional calibration techniques to prepare the DC right-angle torque tool to serve as the master torque tool 10. Many calibration techniques for a single DC right-angle torque tool are known to those skilled in the art and may be utilized to provide verified calibration of the master torque tool 10. One example calibration technique which may be utilized includes a dead weight torque calibration using a calibrated load cell to measure force applied at the terminus of a torque arm. As such, no weights are required to apply specific weight measure to the torque arm having a known defined length. The load cell can record the force applied to the load cell and determine the induced torque allowing the calibration factors of the DC right-angle torque tool to be adjusted to result in a verified and calibrated master torque tool 10.

Figure 2:
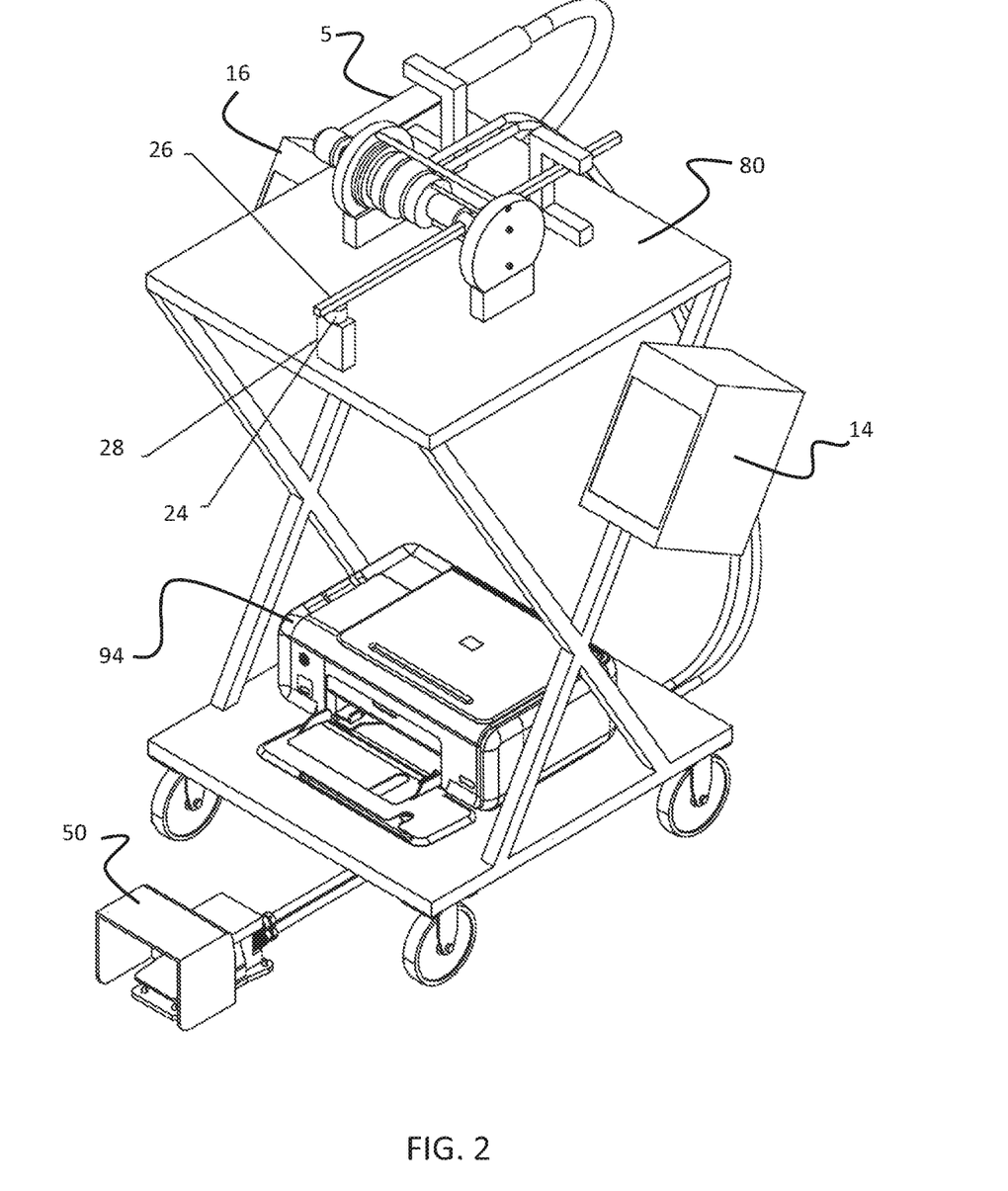
FIG. 2 schematically depicts a system for testing and calibration of a torque device according to one or more embodiments shown or described herein.
Figure 3:
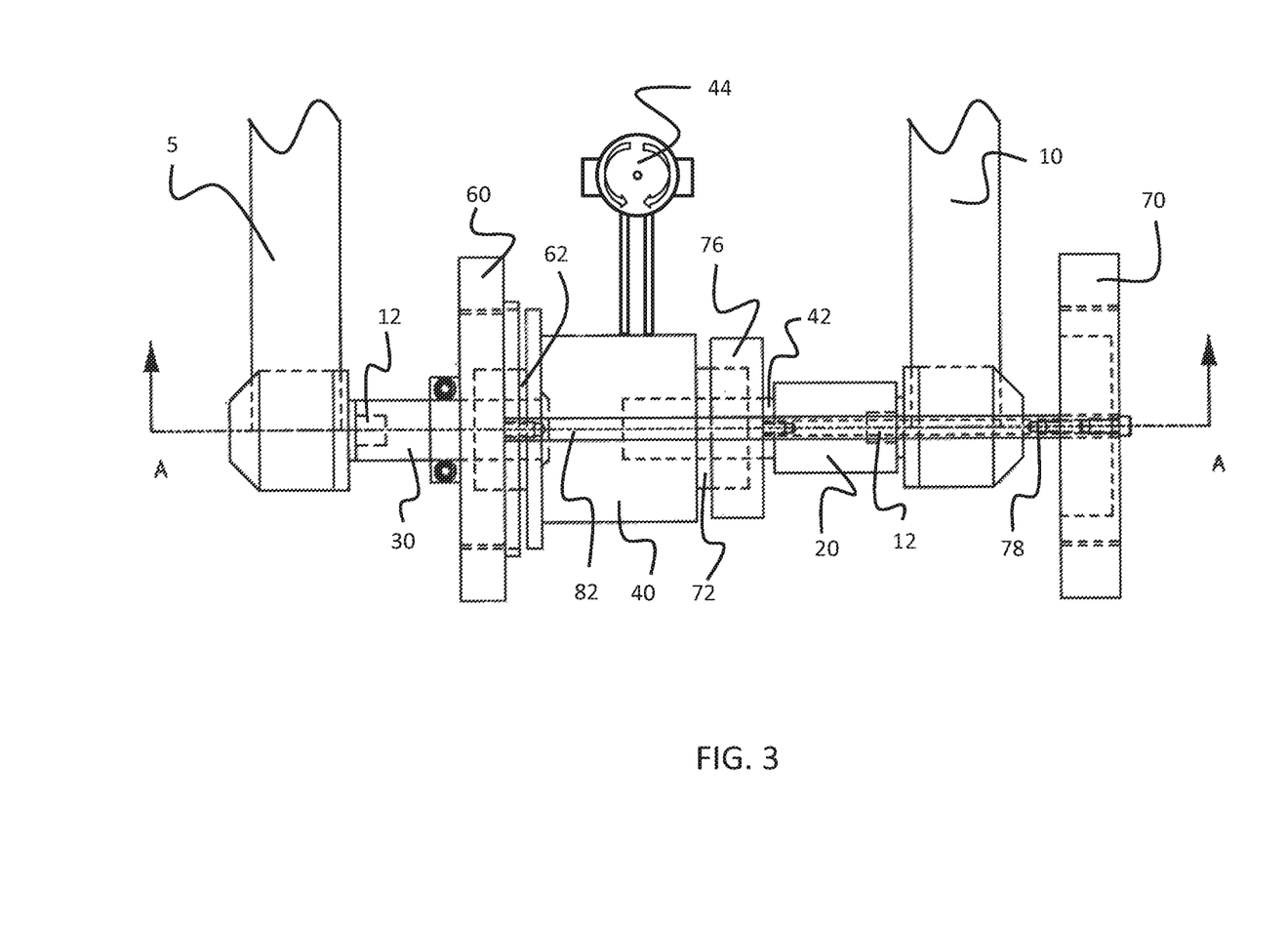
FIG. 3 schematically depicts a testing and calibration system according to one or more embodiments shown or described herein.

DC right-angle torque tools may include a controller 14 which may be adjusted as part of the calibration process to perceive a true torque value. Specifically, the controller 14 may be adjusted in the calibration process to account for wear properties of the DC right-angle torque tool such that the controller rectifies the electrical signal received from a torque transducer in the DC right-angle torque tool to match a true torque value. These corrections are made in preparation of updated calibration factors. With reference to FIGS. 1 and 2, the controller 14 for the master torque tool 10 is illustrated. A second controller 16 may also be provided for the torque device 5 under test and calibration.

It will be appreciated that calibration may be completed on both a vertical axis and a horizontal axis. Horizontal axis calibration may be achieved by zeroing out and accounting for induced effects during horizontal operations before beginning the calibration procedure. It will be appreciated that with the current system there is no gravity factor in play.

In one or more embodiments, the master torque tools may be a dead weight arm 26 engaged with a calibrated load cell 24. An example of the testing and calibration system with a dead weight arm 26 engaged with a calibrated load cell 24 serving as the master torque tool is illustrated in FIG. 2. The calibrated load cell 24 may be positioned on a riser block 28 such that the dead weight arm 26 is horizontal upon contact with the calibrated load cell 24. This technique is similar to that utilized to calibrate the DC right-angle torque tool as the master torque tool. Instead of calibrating a DC right-angle torque tool as the master torque tool, the combination of the calibrated load cell and the dead weight arm may serve as the master torque tool.

Once the master torque tool 10 having an accepted calibration is provided, the torque device 5 to be calibrated may be attached to an input shaft 30 of the testing and calibration system. With reference to FIGS. 1, 2, 3 and 4, the testing and calibration system includes the master torque tool 10, a rotary inline torque transducer 20, the input shaft 30, a torque engagement mechanism 40 operable to transfer rotational torque from the input shaft 30 to the rotary inline torque transducer 20 via an output shaft 42 upon reversible activation of the torque engagement mechanism 40, and a test activator 50 configured to allow an operator of the system to initiate a single rundown test of the torque device 5.

In one or more embodiments, the rotary inline torque transducer 20 includes a transducer that converts a torsional mechanical input into an electrical output signal. Specifically, the rotary inline torque transducer 20 measures dynamic torque when attached to a spinning shaft. The rotary inline torque transducer 20 may be engaged with a square drive 12 provided on the master torque tool 10 such that rotational torque is transferred between the rotary inline torque transducer 20 and the master torque tool 10. The engagement between the rotary inline torque transducer 20 and the square drive 12 of the master torque tool 10 allows the torque at the master torque tool 10 to be determined based on measurement at the rotary inline torque transducer 20. Example rotary inline torque transducers 20 which may be implemented in the testing and calibration system include those available from FUTEK Advanced Sensor Technology, Inc, Irvine, Calif.

An input shaft 30 is provided to provide an interface between the testing and calibration system and the torque device 5 to be tested and calibrated. In one or more embodiments, the input shaft 30 is configured to engage with a square drive 12 of the torque device 5 to provide a mechanical link to transfer the rotational torque output from the torque device 5 into the testing and calibration system.

The testing and calibration system includes a torque engagement mechanism 40 operable to transfer rotational torque from the input shaft 30 to the rotary inline torque transducer 20 via the output shaft 42. It will be appreciated that the torque engagement mechanism 40 may be reversibly activated to engage the transfer of rotational torque from the input shaft 30 to the rotary inline torque transducer 20 on demand.

In one or more embodiments, the torque engagement mechanism 40 may comprise a friction disc clutch operable to transfer rotational motion of the input shaft 30 to the inline torque transducer 20. Specifically, the input shaft 30 may be affixed to one side of the torque engagement mechanism 40 and the output shaft 42 may be affixed to an opposing side of the torque engagement mechanism 40 such that engagement of the torque engagement mechanism 40 results in the friction disc clutch engaging and transferring rotational motions between the input shaft 30 and the output shaft 42. Example torque engagement mechanisms 40 which may be implemented in the testing and calibration system include those commercially available from Logan Clutch Corporation, Cleveland, Ohio.

In one or more embodiments, the torque engagement mechanism 40 is activated upon application of a hydraulic input from a hydraulic fluid or a pneumatic input from a gas. The hydraulic or pneumatic input engages a friction disc in the torque engagement mechanism 40, the friction disc transferring input torque from the input shaft 30 to the output shaft 42, the output shaft 42 engaged with the rotary inline torque transducer 20. The hydraulic or pneumatic input may be provided to the torque engagement mechanism 40 via a flow control valve 44 which is operable to control a rate of the hydraulic fluid flowing or a rate of the gas flowing to the torque engagement mechanism 40 to control the speed of engagement of the torque engagement mechanism 40. It will be appreciated that in further embodiments, the torque engagement mechanism 40 may be electrically activated with an electrical signal engaging the braking mechanism of the torque engagement mechanism 40.

Controlling the speed of engagement of the torque engagement mechanism 40 allows for soft and hard joints to be simulated with the testing and calibration system. It will be appreciated that screw joints vary not only in size but also in type, which changes the characteristics of the joints. Specifically, the tightening angle necessary to achieve the recommended torque of the screw dimension and quality in question measured from the point at which the components and the screw head become tight defines the hardness of the joint and differentiates between soft joints and hard joints. The torque rate can vary considerably for the same diameter of screw. For example, a short screw clamping plain metal components may reach the rated torque in only a fraction of a turn of the screw. This type of joint is defined as a "hard joint". Conversely, a joint with a long screw that has to compress soft components such as gaskets or spring washers requires a much wider angle, possibly even several turns of the screw or nut to reach the rated torque. This type of joint is described as a "soft joint". The ability to simulate joints with a variety of hardness ratings is beneficial as it will be readily appreciated that the continuum of joint hardness, including soft joints and hard joints, each behave differently.

In one or more embodiments, the torque engagement mechanism 40 may be engaged in a programmed manner to simulated different joints including a soft joint and a hard joint. The flow control valve 44 may be operated under closed loop control to automatically adjust the flow control valve 44 to match the desired simulated joint properties. Specifically, in one or more embodiments, methods of calibrating the torque device 5 include programming the flow control valve 44 prior to actuating the test activator 50 to provide the desired flow characteristics of the hydraulic fluid or gas. Closed loop control may use a proportional valve which receives a DC signal from a programmable logic controller (PLC). The DC signal may be representative of the torque signal which would be received from the torque device 5 when tightening an actual joint on the floor and as such include the variability in hardness of the joint. As such, the PLC may then control the position of the proportional valve serving as the flow control valve 44 in real-time to control the rate of gas or hydraulic fluid provided to the torque engagement mechanism 40. This procedure allows torque to be generated over a controlled time horizon to simulate a desired joint type. Specifically, the PLC allows the joint parameters to match those in an actual assembled joint experienced in a manufacturing or assembly process at an assembly plant. The simulated joint may even be representative of the actual joint the particular torque device 5 is utilized to tighten in an assembly plant such that the calibration is made using torque values in alignment with anticipated usage.

It will further be appreciated that in one or more embodiments, the hardness of the simulated joint may be adjusted over a time horizon to simulate a plurality of materials being compressed within the simulated joint. For example, a joint representing the floorboard of an automobile may have changing joint parameters to simulate the initial compaction of a carpet padding, a second joint parameter to simulate the compaction of the carpet fibers, and a final joint parameter to simulate abutment against the metal frame. Usage of a PLC allows the adjustment of the simulated joint parameters to be made automatically. The adjustment may be based on a measured torque value, a measured angle of rotation, or a combination of both.

In one or more embodiments, the flow control valve 44 may include a manual input. Specifically, an operator of the testing and calibration system may adjust an input dial on the flow control valve 44 to manually to select a desired positon prior to beginning testing of the torque device. The position of the input dial on the flow control valve 44 is configured to adjust the flow through the flow control valve 44 and may be selected to represent the simulated joint properties of the testing and calibration system. In various embodiments, the input dial may be a rotational knob, a slider, or an electronic input allowing a specific flow value to be selected on a graphical user interface (GUI).

The testing and calibration system also includes a test activator 50. The test activator 50 may be configured to allow an operator of the testing and calibration system to initiate a single rundown test of the torque device 5. The test activator 50 may be any mechanical or electrical input device capable of initiating flow of the hydraulic fluid or gas to the torque engagement mechanism 40. For example, the test activator 50 may be a foot pedal connected to a valve which initiates flow of the hydraulic fluid or gas upon depression of the foot pedal. Upon actuating the test activator 50, flow of the hydraulic fluid or gas is established to the flow control valve 44 at the torque engagement mechanism 40. In various embodiments, the test activator 50 may be mechanically connected to the valve to initiate flows of the hydraulic fluid or gas or alternatively may be connected with an electrical or radio signal to a remote controller which initiates opening of the valve. It will be appreciated that in further embodiments, the test activator 50 may be a button, switch, or other input mechanism commonly known to those skilled in the art.

In one or more embodiments, the testing and calibration system further comprises a front support stanchion 60 configured and positioned to engage and support the input shaft 30 and a rear support stanchion 70 configured to engage and support the output shaft 42. Specifically, the front support stanchion 60 and the rear support stanchion 70 maintain alignment of the components of the testing and calibration system.

In one or more embodiments, the front support stanchion 60 may comprise a front support bearing 62 positioned within a front riser block 64. The front support bearing 62 may be configured and positioned to allow free rotation of the input shaft 30 when engaged in the front support stanchion 60. A two-piece set collar 66 may also be affixed to the input shaft 30 abutted against the front rise block 64 to position and restrain various components of the testing and calibration system.

Figure 4:
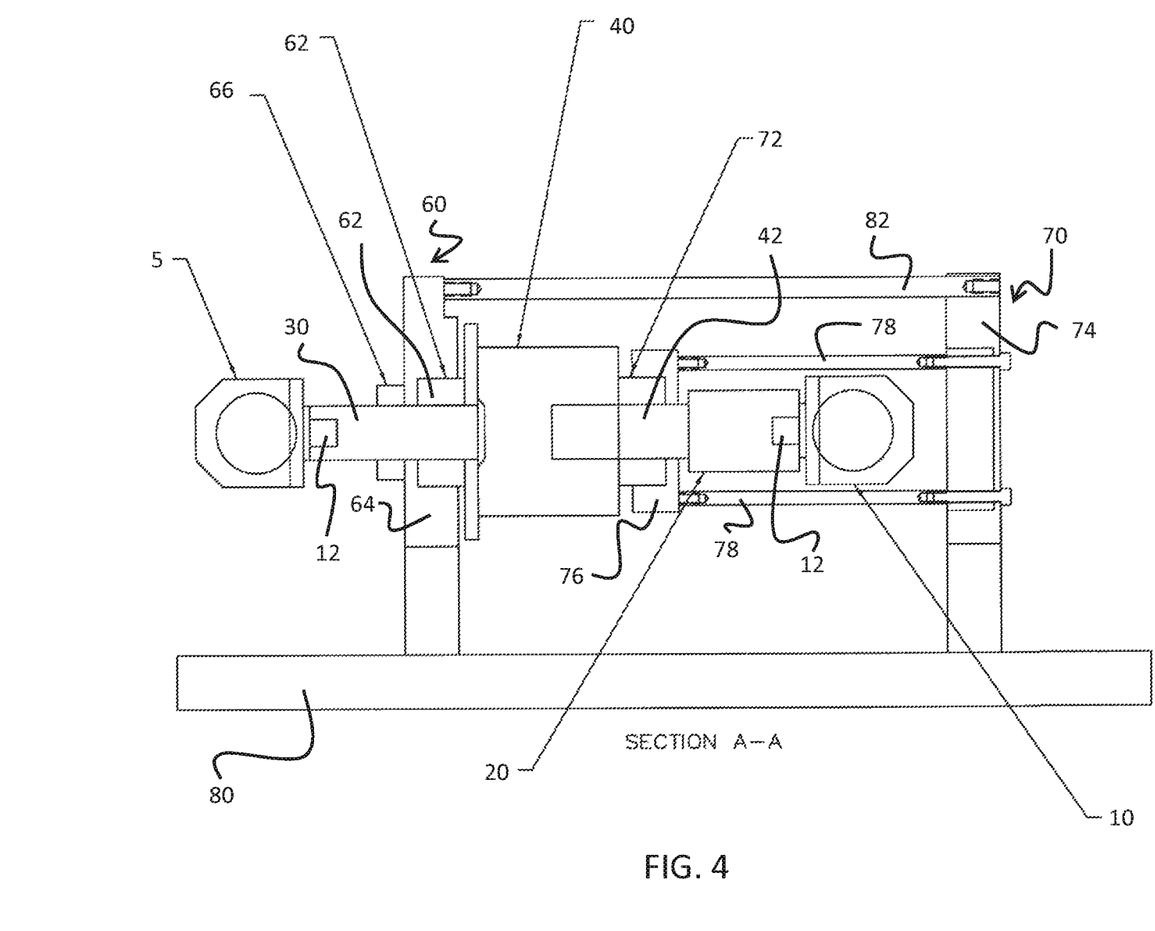
FIG. 4 schematically depicts the testing and calibration system of FIG. 3 cut along line A-A according to one or more embodiments shown or described herein.

In one or more embodiments, the rear support stanchion 70 may comprise a rear support bearing 72 configured and positioned to allow free rotation of the output shaft 42 when engaged in the rear support stanchion 70. With reference to FIG. 4, the rear support stanchion 70 may further compromise a rear riser block 74, a front carrier 76 housing the rear support bearing 72, and a plurality of rigid shafts 78 connecting the rear riser block 74 and the front carrier 76 to support the front carrier 76 in a cantilevered manner. In one or more embodiments, the rigid shafts 78 may include threaded ends to engage with a threaded retaining pin. The threaded retaining pin may be a bolt with a threaded end, for example, to interlock with the rigid shafts 78. A first set of threaded retaining pins may be passed through holes in the rear riser block 74 to secure one end of each rigid shaft 78 to the rear riser block 74. A second set of threaded retaining pins may be passed through holes in the front carrier 76 to secure an opposite end of each rigid shaft 78 to the front carrier 76.

With continued reference to FIG. 4, in one or more embodiments, the front support stanchion 60 and the rear support stanchion 70 are mounted to a rigid substrate 80 and connected by one or more rigid bars 82 to maintain spacing and orientation of the front support stanchion 60 and the rear support stanchion 70. In one or more embodiments, the rigid bars 82 may include threaded ends to engage with a threaded retaining pin at each end. The threaded retaining pin may be a bolt with a threaded end, for example, to interlock with the rigid bars 82. A first threaded retaining pin may be passed through a hole in the rear support stanchion 70 to secure one end of the rigid bar 82 to the rear support stanchion 70. A second threaded retaining pin may be passed through a hole in the front support stanchion 60 to secure an opposite end of each rigid bar 82 to the front support stanchion 60.

In one or more embodiments, the testing and calibration system may further comprise one or more retaining clamps 90 configured to restrain the master torque tool 10 and the torque device against reaction torque during testing and calibration of the torque device 5 as illustrated in FIGS. 1 and 2. During operation of each rundown test the reaction torque of the torque device and the master torque tool 10 would result in the torque device 5 and the master torque tool 10 spinning in a direction opposite of the applied torque. As such, the retaining clamps 90 may be positioned to restrain each of the torque device 5 and the master torque tool 10 to prevent rotation during testing. In one or more embodiments, the retaining clamps 90 may comprise an arm secured to the rigid substrate 80 and positioned to abut the torque device 5 or the master torque tool 10 such that the arm provides a barrier to rotation of the torque device and the master torque tool 10 during testing. It will be appreciated that the arm may be adjustable to accommodate variations in dimensions and shape of the torque device 5 and the master torque tool 10.

Once the torque device 5 to be tested and calibrated is engaged with the testing and calibration system as previously described, the torque device 5 is energized to a free spin under a no load and zero torque condition. The torque device 5 is allowed to spin freely and as such the input shaft 30 also rotates in a free manner as the torque engagement mechanism 40 is kept in a non-engaged arrangement. Allowing the torque device 5 to be freely spinning simulates the dynamic effect of a spinning tool in operation on an assembly floor.

In one or more embodiments where the master torque tool 10 is a DC right-angle torque tool, the master torque tool 10 may also be energized to a free spin under a no load and zero torque condition prior to actuating the test activator 50 to engage the torque engagement mechanism 40. As such, it will be appreciated that the master torque tool 10 and the torque device 5 are both in a free spin under a no load and zero torque condition prior to engaging the torque engagement mechanism 40 and transferring torque between the master torque tool 10 and the torque device 5.

With the master torque tool 10 and the torque device 5 both in a free spin under a no load and zero torque condition, a run down test may be initiated. The run down test is initiated by actuating the test activator 50 which causes the torque engagement mechanism 40 to activate such that rotational torque from the input shaft 30 is transferred to the rotary inline torque transducer 20 via the output shaft 72 and from the rotary inline torque transducer 20 to the master torque tool 10.

During the run down test, the torque device 5, the master torque tool 10, and the rotary inline torque transducer 20 each measure the torque generated during the run down test. In one or more embodiments, a first parameter representative of a torque value from the master torque tool 10 is measured, a second parameter representative of a torque value from the torque device 5 is measured, and a third parameter representative of a torque value from the rotary inline torque transducer 20 is measured to generate a data set. The parameters measured from the master torque tool 10 and the rotary inline torque transducer 20 are provided by calibrated sensors which are fully traceable. The acquisition of multiple torque measurement in the form of the first parameter, the second parameter, and the third parameter allows for verification of torque readings in the form of witness measurements. Specifically, the first and third parameters serve as witness measurements to the second parameters representative of the torque value from the torque device.

The run down test may then be repeated a plurality of times to generate a plurality of data sets. Specifically, the test activator 50 may be actuated repeatedly to cyclically engage and disengage the torque engagement mechanism 40. With each actuation of the test activator 50, an additional data set of the first parameter, the second parameter, and the third parameter may be acquired. In various embodiments, 3 to 50, 3 to 30, 9 to 24, 12 to 18, or 15 data sets may be acquired with each data set comprising the first parameter, the second parameter, and the third parameter from a single run down test.

The run down tests may be completed at a variety of toque levels to validate and calibrate over the operation range of the torque device 5. For example, with 15 run down tests, 3 run down tests may be completed at each of 5 scales. Specifically, in one or more embodiments, run down tests may be completed 3 times at each of 20% of target torque, 40% of target torque, 60% of target torque, 80% of target torque, and 100% of target torque. With duplicative run down tests at each scale of the target torque value, the measured torque values may be averaged with an arithmetic mean to produce a single representative torque value.

The first parameter, the second parameter, and the third parameter from each data set may then be transferred to a software package. It will be appreciated that the plurality of data sets may be transferred to the software package in a piecemeal manner immediately upon acquisition of each data set, as a bulk data set once all run down tests have been completed, or as multiple data sets upon acquisition of multiple data sets. The software package is configured to manipulate the plurality of data sets to generate new calibration factors for input into a programmable control system of the torque device. It will be appreciated that the mathematical manipulation of the plurality of data sets to determine new calibration factors is known to those skilled in the art based on previous methods. A calibration sheet is automatically generated by the software package and can be sent to a printer 94 for document retention. It will be appreciated that the digital importation of the first, second, and third parameters along with other data from the integrated controllers for the DC right-angle torque tools (torque device 5 and master torque tool 10) eliminates hand entry of tested torque readings saving both time and improving accuracy of the input data.

In one or more embodiments, the software package is configured to automatically change and update the calibration factor in the programmable control system 16 of the torque device 5 without manual input from an operator. For example the software package may send updated calibration factors via an Ethernet interface or a wireless signal automatically after receipt and manipulation of the data sets. It will be appreciated that the input and output channels of the software package may be the same with the Ethernet interface or the wireless signal serving to both receive the data from the various components of the system as well as transmitting update calibration factors back to the programmable control system 16.

As the testing and calibration system does not rely on compression of washer stacks as is traditionally required for torque calibrations, repeated measurements in the calibration process may be completed without downtime to unwind the washer stacks. Further, the inclusion of the master torque tool 10 which serves as a traceable calibration standard allows for serial calibration of multiple torque devices 5 without necessitating deadweight calibration for each iteration.

It is also noted that recitations herein of "at least one" component, element, etc., should not be used to create an inference that the alternative use of the articles "a" or "an" should be limited to a single component, element, etc.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein. Further, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of calibrating a torque device, the method comprising
    (I) providing a master torque tool, the master torque tool having an accepted calibration;
    (II) attaching the torque device to be calibrated to an input shaft of a testing and calibration system, the system comprising:
        the master torque tool;
        a rotary inline torque transducer engaged with a square drive of the master torque tool;
        the input shaft, the input shaft configured to engage with a square drive of the torque device;

a torque engagement mechanism operable to transfer rotational torque from the input shaft to the rotary inline torque transducer via an output shaft upon reversible activation of the torque engagement mechanism; and a test activator configured to allow an operator of the system to initiate a single rundown test of the torque device;

(III) energizing the torque device to a free spin under a no load and zero torque condition such that the input shaft rotates;

(IV) initiating a single run down test by actuating the test activator, wherein actuating the test activator causes the torque engagement mechanism to activate such that rotational torque from the input shaft is transferred to the rotary inline torque transducer via the output shaft and from the rotary inline torque transducer to the master torque tool;

(V) measuring a first parameter representative of a torque value from the master torque tool;

(VI) measuring a second parameter representative of a torque value from the torque device;

(VII) measuring a third parameter representative of a torque value from the rotary inline torque transducer;

(VIII) transferring the first parameter, the second parameter, and the third parameter to a software package;

(IX) repeating steps (IV) through (VIII) to generate a plurality of data sets, each data set comprising the first parameter, the second parameter, and the third parameter from a single iteration of steps (IV) through (VIII); and (X) generating new calibration factors for input into a programmable control system of the torque device based on the plurality of data sets with the software package.

2. The method of claim 1, wherein the master torque tool is a direct current (DC) torque tool and step (III) further comprises energizing the master torque tool to a free spin under a no load and zero torque condition prior to actuating the test activator.

3. The method of claim 1, wherein the master torque tool is a dead weight arm engaged with a calibrated load cell.

4. The method of claim 1, wherein the torque mechanism comprises a friction disc engagable in a programmed manner, the friction disc transferring input torque from the input shaft to the output shaft, the output shaft engaged with the rotary inline torque transducer.

5. The method of claim 4, wherein the torque engagement mechanism is activated upon application of a hydraulic input from a hydraulic fluid or a pneumatic input from a gas with the friction disc engagable upon application of the hydraulic or pneumatic input, and the system further comprises a flow control valve operable to control a rate of the hydraulic fluid flowing or a rate of the gas flowing to the torque engagement mechanism to control the speed of engagement of the torque engagement mechanism.

6. The method of claim 5, wherein the flow control valve operated under closed loop control and the method further includes programming the flow control valve prior to actuating the test activator to provide the desired flow characteristics of the hydraulic fluid or gas.

7. The method of claim 5, wherein the method further includes adjusting the flow control valve prior to actuating the test activator to provide the desired flow characteristics of the hydraulic fluid or gas.

8. The method of claim 1, wherein the system further comprises a front support stanchion configured to engage and support the input shaft and a rear support stanchion configured to engage and support the output shaft.

9. The method of claim 8, wherein the front support stanchion comprises a front support bearing positioned within a front riser block, the front support bearing configured to allow free rotation of the input shaft when engaged in the front support stanchion and the rear support stanchion comprises a rear support bearing configured to allow free rotation of the output shaft when engaged in the rear support stanchion.

10. A system for testing and calibration of a torque device, the system comprising a master torque tool, the master torque tool having an accepted calibration;

a rotary inline torque transducer engaged with a square drive of the master torque tool;

an input shaft configured to engage with a square drive of the torque device;

a torque engagement mechanism operable to transfer rotational torque from the input shaft to the rotary inline torque transducer via an output shaft upon reversible activation of the torque engagement mechanism;

a front support stanchion configured to engage and support the input shaft;

a rear support stanchion configured to engage and support the output shaft; and a test activator configured to allow an operator of the system to initiate a single rundown test of the torque device.

11. The system of claim 10, wherein the master torque tool is a direct current (DC) torque tool.

12. The system of claim 10, wherein the master torque tool is a dead weight arm engaged with a calibrated load cell.

13. The system of claim 10, wherein the torque engagement mechanism comprises a friction disc engagable in a programmed manner, the friction disc transferring input torque from the input shaft to the output shaft, the output shaft engaged with the rotary inline torque transducer.

14. The system of claim 13, wherein the torque engagement mechanism is activated upon application of a hydraulic input from a hydraulic fluid or a pneumatic input from a gas.

15. The system of claim 14, wherein the system further comprises a flow control valve operable to control a rate of the hydraulic fluid flowing or a rate of the gas flowing to the torque engagement mechanism to control the speed of engagement of the torque engagement mechanism.

16. The system of claim 15, wherein the flow control valve is operated under closed loop control.

17. The system of claim 10, wherein the front support stanchion comprises a front support bearing positioned within a front riser block, the front support bearing configured to allow free rotation of the input shaft when engaged in the front support stanchion and the rear support stanchion comprises a rear support bearing configured to allow free rotation of the output shaft when engaged in the rear support stanchion.

18. The system of claim 17, wherein the rear support stanchion further compromises a rear riser block, a front carrier housing the rear support bearing, and a plurality of rigid shafts connecting the rear riser block and the front carrier housing to support the front carrier housing in a cantilevered manner.

19. The system of claim 17, wherein the front support stanchion and the rear support stanchion are mounted to a rigid substrate and connected by one or more rigid shafts to maintain spacing and orientation of the front support stanchion and the rear support stanchion.

20. The system of claim 10, wherein the system further comprises one or more retaining clamps configured to restrain the master torque tool and the torque device against reaction torque during testing and calibration of the torque device.

* * * * *